United States Patent
Shavro

(10) Patent No.: US 10,289,536 B2
(45) Date of Patent: May 14, 2019

(54) DISTINGUISHING PUBLIC AND PRIVATE CODE IN TESTING ENVIRONMENTS

(71) Applicant: Synopsys, Inc., Mountain View, CA (US)

(72) Inventor: Tamir Shavro, Hertzelia (IL)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/693,341

(22) Filed: Aug. 31, 2017

(65) Prior Publication Data
US 2018/0060224 A1 Mar. 1, 2018

Related U.S. Application Data

(60) Provisional application No. 62/382,239, filed on Aug. 31, 2016.

(51) Int. Cl.
*G06F 11/36* (2006.01)

(52) U.S. Cl.
CPC ...... *G06F 11/3688* (2013.01); *G06F 11/3676* (2013.01); *G06F 11/3684* (2013.01)

(58) Field of Classification Search
CPC .. G06F 11/36; G06F 11/3604; G06F 11/3676; G06F 11/3684; G06F 11/3688; G06F 11/3668; G06F 21/564; G06F 21/566; G06F 21/563
USPC .................................................. 717/124–135
See application file for complete search history.

(56) References Cited

U.S. PATENT DOCUMENTS

| | | | | |
|---|---|---|---|---|
| 8,498,982 | B1* | 7/2013 | Cope | G06F 21/16 707/722 |
| 8,756,432 | B1* | 6/2014 | Chen | G06F 21/565 713/187 |
| 9,239,774 | B2* | 1/2016 | Paveza | G06F 11/362 |
| 9,390,268 | B1* | 7/2016 | Martini | G06F 21/566 |
| 9,436,463 | B2* | 9/2016 | Sass | G06F 8/751 |
| 9,904,614 | B2* | 2/2018 | Stevens | G06F 11/3624 |
| 2006/0230288 | A1* | 10/2006 | Fox | G06F 21/563 713/188 |
| 2013/0311496 | A1* | 11/2013 | Fedorenko | G06F 8/71 707/758 |
| 2014/0282417 | A1* | 9/2014 | Paveza | G06F 11/362 717/125 |
| 2015/0199261 | A1* | 7/2015 | Paveza | G06F 11/3664 717/124 |
| 2016/0098563 | A1* | 4/2016 | Sharma | G06F 21/577 726/25 |

(Continued)

*Primary Examiner* — Marina Lee
(74) *Attorney, Agent, or Firm* — Fenwick & West LLP

(57) ABSTRACT

A code testing system identifies code for an application as being related to publically-available code, and modifies testing for the application for the code segments corresponding to the publically-available code. The code testing system identifies code segments in the application and generates a signature of the code segment. The signature is matched against signatures for publically-available code, and code segments for the application that match the publically-available code are identified. The matching segments may be tested with different analysis than the code which does not match publically-available code and thus correspond to privately developed code by an application developer.

18 Claims, 3 Drawing Sheets

(56) References Cited

U.S. PATENT DOCUMENTS

| | | | |
|---|---|---|---|
| 2016/0202972 A1* | 7/2016 | Sass | G06F 8/751 |
| | | | 717/121 |
| 2016/0292066 A1* | 10/2016 | Stevens | G06F 11/3624 |
| 2018/0011778 A1* | 1/2018 | Shavro | G06F 11/3676 |
| 2018/0060044 A1* | 3/2018 | Hao | G06F 8/33 |
| 2018/0060224 A1* | 3/2018 | Shavro | G06F 11/3688 |
| 2018/0227326 A1* | 8/2018 | Shavro | H04L 63/1475 |

* cited by examiner

DISTINGUISHING PUBLIC AND PRIVATE CODE IN TESTING ENVIRONMENTS

CROSS-REFERENCE TO RELATED APPLICATIONS

This application claims the benefit of U.S. Provisional Application No. 62/382,239, filed on Aug. 31, 2016, which is hereby incorporated by reference herein.

BACKGROUND

This invention relates generally to improving software testing, and particularly to identifying public and private code in a test application.

Software applications written by developers can include code written by the developer ("private code") as well as code retrieved from a repository of public code ("public code"). Public code is available from many different sources, and permits a software developer to add functionality from the public code without re-writing functionality that is already available at the public repository. This public code typically includes functions that may be of interest to many different developers, for example to provide back-end services, logging, database access and maintenance, and other types of services, among other functions. The public code may be retrieved and included with other functions that are written by the developer ("private code") to form an application.

To determine errors and perform other analysis of the application, testing may be performed on the application by a code testing system. The code testing system automatically analyzes the application, and may apply static (on the code itself) or dynamic (on the executing application) testing to determine potential problems in the application, such as memory leaks, security vulnerabilities, and the like. For applications of any significant size, the application testing may take substantial time for a full suite of testing. During this testing period, the application developers typically cannot change the version as it is being tested, and the application developer must wait for the testing to complete. Current testing may test the application without regard to the source of the code (i.e., public or private code). For public code, problems in the application represent problems generated by (and typically fixable by) the authors of the public code. By including the public code in normal testing by the code testing system, the tests may take a long time to exercise portions of the public code, and may report errors that are irrelevant to the application developer because the developer does not have control over the public code.

SUMMARY

A code testing system performs testing of a test application and distinguishes between public code and private code in performing tests. The code testing system automatically generates tests and performs the tests on the test application. The code testing system may perform static and dynamic tests on the test application to determine errors or deficient performance of the test application. The code testing system increases the efficiency of the automatic testing by identifying portions of code that are from public sources ("public code"), and applying different tests to the code from public sources. In general, the different tests reduce the testing performed on the identified public code, thereby reducing the time for analyzing the test application as a whole and permitting faster and more efficient analysis of the test application. The identification of the public code may also be used to automatically identify the related code at a public code repository and retrieve related information from analysis of the code from the public code repository in lieu of analyzing the public code in the test application.

To identify public code, the code testing system receives the test application and identifies a set of code segments of the test application for analysis. Each code segment is a logically separable portion of the test application representing a different piece of code for analysis. Depending on various implementations, the code segments may be individual functions, classes, files, and the like. Each logically separable portion of the test application is analyzed to determine a signature of the code segment. The signature of the code segment may include a hash value of the code segment or other near-unique value generated from the code segment. The signature may also include characteristics of the code segment that may indicate the code segment's origin as public code. For example, the characteristics may include a namespace of the code segment.

Each code segment is checked to determine whether the signature of the code segment matches a signature of a public code segment. For example, the code segment may be determined as public code when the hash value or the namespace match a hash value or namespace from an index of public code segments. Code segments that are determined as public code segments are excluded from at least tests from a set of tests performed on the code segments that are not determined as public code segments. This permits the code testing system to automatically determine whether code test segments are public code and to automatically reduce the testing for the application while maintaining testing of the code segments that were written specifically for the application (i.e., are private code segments generated by a developer for the application).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
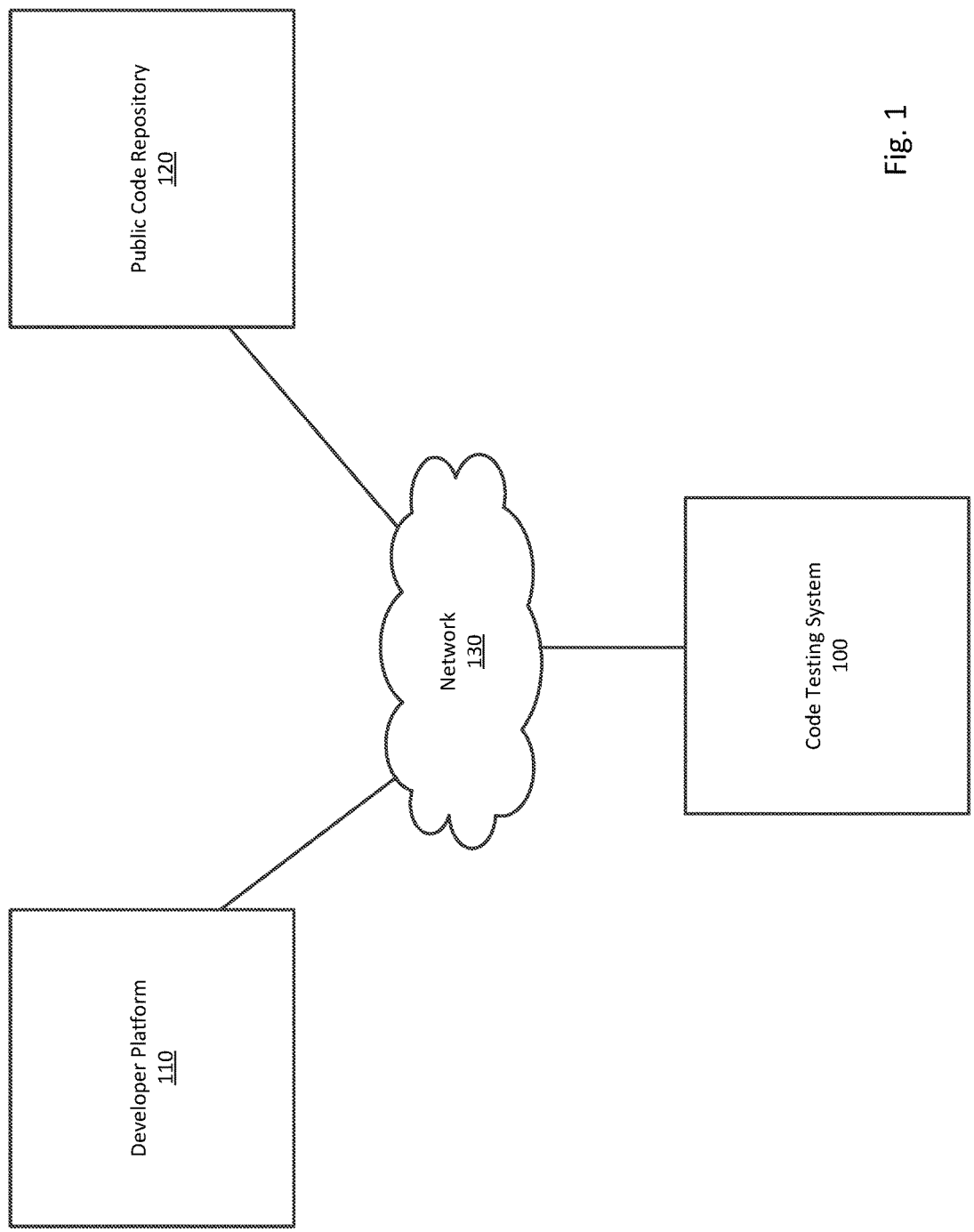
FIG. 1 illustrates a code development and testing environment according to one embodiment.

FIG. 1 illustrates a code development and testing environment according to one embodiment. Developers operating a developer platform 110 create applications to be tested by a code testing system 100. During development, the developers may incorporate publically-available code from a public code repository 120. To improve efficiency of code testing, the code testing system 100 automatically identifies the public code and applies a different set of tests to the code segments in the application that are identified as public code. This increases efficiency of the testing and permits identification of the public code to the developer that may not otherwise be easily visible. The components and systems shown in FIG. 1 are shown to illustrate this disclosure for simplicity and convenience. Additional features and systems may be further included in various practiced embodiments. For example, a large number of developer platforms 110 and public code repositories 120 may be included in practice, which may include additional components and features not discussed herein.

The developer platform 110, public code repository 120, and code testing system 100 may communicate via a network 130. The network 130 may be any suitable wired or wireless communication channel for transmitting data between these systems, such as private networks, as well as public networks such as the Internet.

The developer platform 110 provides an application to the code testing system 100 for testing and analysis. In some embodiments, the code testing system 100 is incorporated into the developer platform 110, and analysis of the application is performed by the developer. In other examples, as shown in FIG. 1, the developer platform 110 provides the application to a separate code testing system 100.

The application provided to the code testing system 100 may be various different types of applications. In one example, the application is a compiled application that is prepared in a package for execution by one or more systems when the application is deployed. The application may have been developed in various languages, such as JAVA, C++, JAVASCRIPT, PYTHON, and so forth. Depending on the language in which the application is developed, the application may be provided to the code testing system 100 as a compiled application, or may be an uncompiled interpretable script (e.g., PYTHON).

As one example, a JAVA application may be distributed as a .jar file that includes a collection of compiled code for the application.

In developing the application, developers of the application may retrieve publically-available code from a public code repository 120. The public code repository includes various software packages and open source code for developers to incorporate into applications. The public code repository 120 may maintain code organized by projects and include various metadata about each project associated with public code. For example, each project may specify a license under which other users may incorporate the public code. Some licenses may be permissive, for example permitting any user to incorporate the code, while other licenses may require that code directly incorporating or modifying the public code must itself be public and distributed to users. The public code repository 120 may also provide repository and versioning systems for the public code, for example permitting general public users to further develop and contribute to the public code. The public code repository 120 may also maintain bug tracking for versions of the public code and maintain a list of known defects for the public code.

When developers of applications at the developer platform 110 incorporate public code from the public code repository 120, the public code may not be identified by the developers in the application. While the public code may be separately included, for example as a library accessed by the application, in other cases portions of the public code may be directly copied, for example by copying a function included in a library without incorporating the library itself into the application. Typically, such public code is included in the application with code that has been developed by the developer without distinction within the application or the compiled application.

The code testing system 100 receives the application from the developer platform 110 and identifies code segments as public or private code and performs different tests to the code segments based on that identification.

Figure 2:
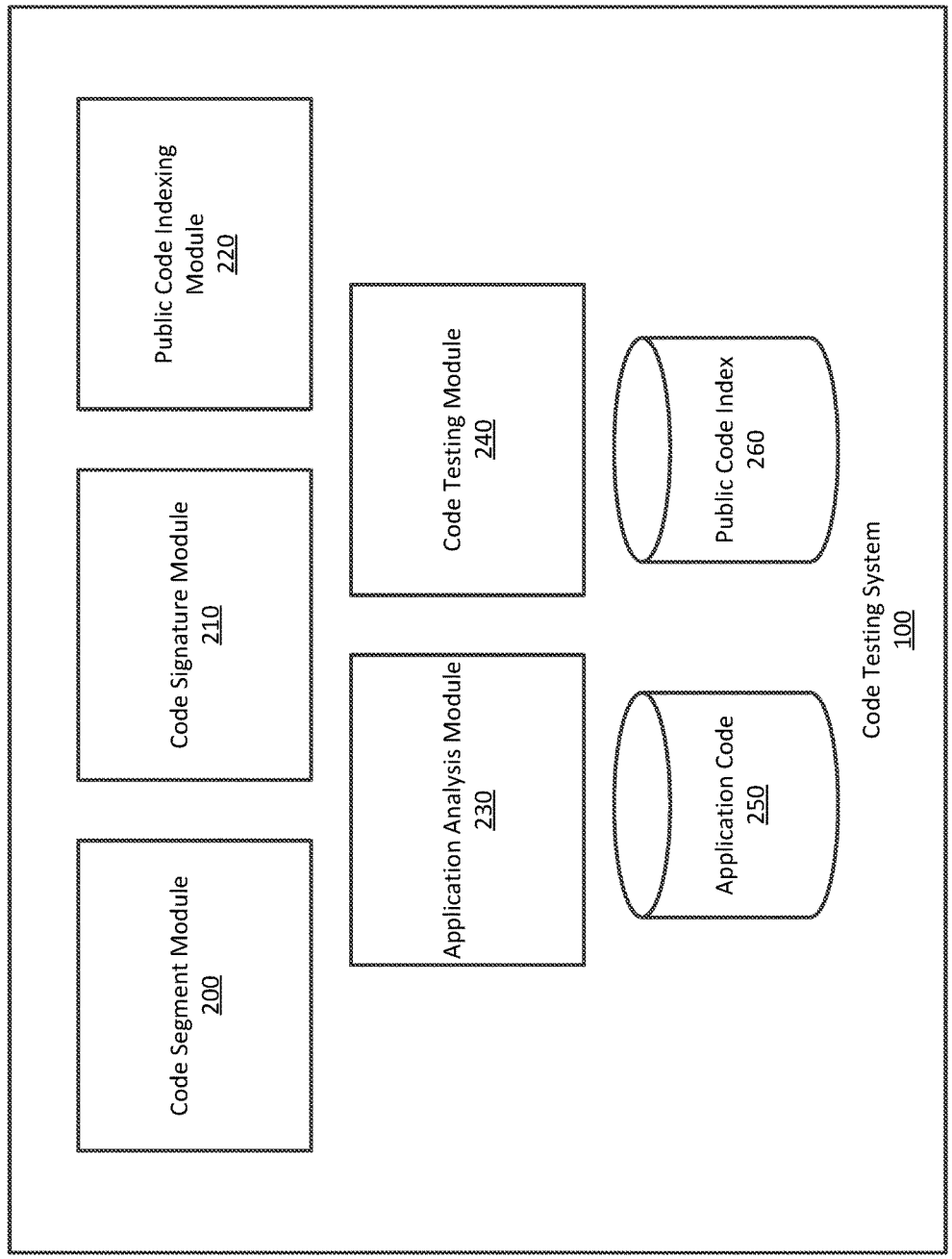
FIG. 2 illustrates components of an example code testing system according to one embodiment.

FIG. 2 illustrates components of an example code testing system according to one embodiment. The code testing system 100 includes various modules and data stores to permit identification of public code within an application. These modules include a code segment module 200, a code signature module 210, a public code indexing module 220, an application analysis module 230, and a code testing module 240. Application code 250 and associated test results may also be stored, along with a public code index 260 describing public code at the public code repository 120.

As further discussed below, to identify public and private portions of the code, the code testing system 100 identifies and analyzes code segments from the public code repository 120 and the application by determining a signature and other characteristics of the code segments, then attempts to identify a match between application code segments and the public code segments from the public code repository 120. When the match is identified, testing is varied for the public code segments of the application relative to the testing for code segments that were not identified as public code.

The code segment module 200 identifies code segments in an application or in code from the public code repository. A code segment is a separate logical portion of code. In various embodiments, the code segments may be identified as separate functions or classes in the code. Each class may be associated with a set of separate functions, each of which may be individually identified as a separate code segment. In one example, within compiled code a segment may be a logical portion of the compiled code prior to a branch (i.e., an "if-then-goto" or similar function).

The code segment module 200 parses an application or public code to identify these code segments. For example, a JAVA application may be distributed in a package as a .jar file including a set of classes. The code segment module 200 may identify each class in the .jar file as a separate code segment. In addition, each function for each class may also be separately identified as a code segment.

In this example, when each function in a class is identified as a code segment, it may be possible to determine when code segments have been copied from a public source even when a public library is not used directly in the application.

The code signature module 210 receives identified code segments and determines a unique or near-unique signature for each code segment. The signature may be determined in various ways, and in one embodiment is a hash value obtained by applying a hash function to the code segment. The hash function is applied to the code of the code segment to determine a near-unique value from the hash function. The hash function may be collision-resistant to reduce the likelihood that dissimilar code segments may be identified as having the same hash value. In some examples, the hash function is a one-way or "cryptographic" hash function such as SHA-1 or MD5 algorithms to increase collision-resistance.

The signature of the code segment may include a hash value of the code segment or other near-unique value generated from the code segment. The signature may also include characteristics of the code segment that may be used to identify the code segment's origin as public code. For example, the characteristics may include a namespace of the code segment. In some programming languages, classes and other functions may belong to a namespace that describes a package or programming scope with which the code segment is associated. For example, each class in JAVA is associated with a particular namespace from which the class may be instantiated. As a further example, contributors to the public code repository 120 may include a namespace for the public code project, for example as "org.publiccontributor.com" Similarly, a developer for an application of developer platform 110 may include a namespace specific to that application, for example "developerplatform.application" as a namespace for the application. The code signature module 210 identifies these additional characteristics and associates the characteristics with the code segment and its signature.

The public code indexing module 220 retrieves code from the public code repository 120 and analyzes the retrieved code to generate and update information of the public code in the public code index 260. The public code retrieved from the public code repository may be compiled prior to analysis, and is provided to the code segment module 200 and code signature module 210 to identify code segments and associated signatures of the public code. The signatures of the public code are stored in the public code index 260, along with an identification of the project from which the public code is associated. The public code indexing module 220 may retrieve public code from the public code repository 120 and determine when new versions of public code are available, retrieve the new version and identify code segments and associated signatures of the new version. Each version of a public code project may be separately stored in the public code index 260. In addition, the public code indexing module 220 may retrieve and store an address for the public code repository 120 at which defects or bugs are listed for each version of the public code. The public code indexing module 220 may also provide the public code to the code testing module 240 for analysis. The results of tests performed by the code testing module 240 may be stored in the public code index 260 along with the public code signatures.

When an application is analyzed by the code testing system 100, the application analysis module 230 determines which tests to be performed on code sections associated with the application. The application analysis module 230 receives the application and uses the code segment module 200 to identify code segments in the application. Next, the application analysis module 230 sends the code segments for the application for analysis by the code signature module 210 to determine a signature for the code segments of the application.

The application analysis module 230 then analyzes the signatures of the code segments associated with the application to determine whether the signature for code segments of the application match any signatures for the public code. To determine the match, the signature for each code segment is looked up in the public code index 260 to determine whether the signature exists in the public code index 260. For example, the public code index may access the public code index 260 according to a hash value in the signature to determine whether an entry exists for that hash value. Similarly, characteristics of the code segment may be used to determine whether a code segment matches public code. For example by determining whether a namespace associated with the code segment matches indexed public code.

In an additional configuration, the signature for a code segment must identically match an indexed code segment, including any additional characteristics. In this configuration, a code segment that matches a hash value in the public code, but does not match a namespace, is not treated as a match. This may prevent analysis of compiled code that compiles to the same signature as public code from another source from being treated as public code.

When an application code segment does not match a public code segment from the index, the code segment is assigned to a primary test group of code segments, on which first set of code analysis tests (or "tests") are performed. When the application code segment does match a public code segment from the index, the code segment is assigned to a secondary test group of code segments, on which a second set of code analysis tests are performed. The first set of tests applicable to the code segments that do not match any public code segments (the primary group) generally reflects a more comprehensive set of tests, while the second set of tests applicable to the code segments that do match public code segments (the secondary group) are generally reduced in time and complexity from the first set of tests. In one example, no tests are performed for the second set of tests.

The code testing module 240 performs testing of code segments. In particular, the code testing module 240 performs the first set of tests for the application code segments that do not correspond to public code, and the second set of tests for the application code segments that correspond to public code. The first set of tests may include a wide variety of testing, which may be generated automatically and performed against the code segments. The testing may include static and dynamic analysis. Static analysis includes methods and algorithms for deriving facts and heuristic inferences about computer programs without actually running those programs, for example by analysis of the code itself. Dynamic analysis includes methods for analyzing the running program to identify additional performance of the application during execution. The static and dynamic analysis performed by the code testing module 240 may include various tests to determine security vulnerabilities, performance, memory leakage, data leakage, and other averse ways in which the application does not perform as desired.

To implement the dynamic analysis, the application is monitored during execution in various ways. To monitor individual code segments, the code testing module 240 may implement various means for monitoring the code segments, such as instrumentation and breakpoints to the code segments With instrumentation, hooks and other means of assessing the performance and activity of the code segment are added to the code segment or to library or system functions that may be called by the code segment. For example, when a code segment requests a database access from a library function, the instrumentation may modify the standard access request function to also record information relating to the request or the state of the code. In another example, the instrumentation is performed by executing the code segment in a testing environment that monitors variables and functions called by the code segment. Breakpoints may also be inserted in the code segment, such that variables and the state of the code segment may be monitored at the break point to determine application execution. The application may be provided simulated inputs to test the operation of the application during this analysis to determine the code segment's actions when those simulated inputs are received.

These various static and dynamic analyses (among others) may be applied to the first set of code segments by the code testing module 240. The code testing module 240 applies another set of code testing to the second set of code segments, which correspond to the identified public code. For the second set of code segments, the code testing module 240 may reduce the amount of testing performed, and in some cases does not perform any static or dynamic analysis of the public code segments. The code testing module 240 may leverage known information about the public code to provide such vulnerabilities and other leaks that were already determined by other analysis of the public code, and retrieve information about the public code segments from the public code index 260 and the public code repository 120 to identify additional information about the public code segment. In one example, the second set of tests includes determining known defects in the public code segment by identifying the project related to the public code and identifying bugs or other defects listed at the public code repository 120 for the public code. The code testing system 100 may also have previously run testing on the public code, which may be reported for the identified public code.

In another example, the public code in the application may be identified with a version of the public code at the public code repository 120, and the code testing module 240 determines whether a more recent version of the public code is available at the public code repository 120. In addition, when the code testing module 240 performs testing of the application as a whole, the code testing module 240 may generate a report of the test coverage of the code segments for the application. The test coverage may be separated into portions relating to the public code and portions relating to the code that is not public code (i.e., developed for the developer platform 110). In this way, the code testing module 240 can report testing coverage for the application that relates to the code developed by the developer platform 110.

Figure 3:
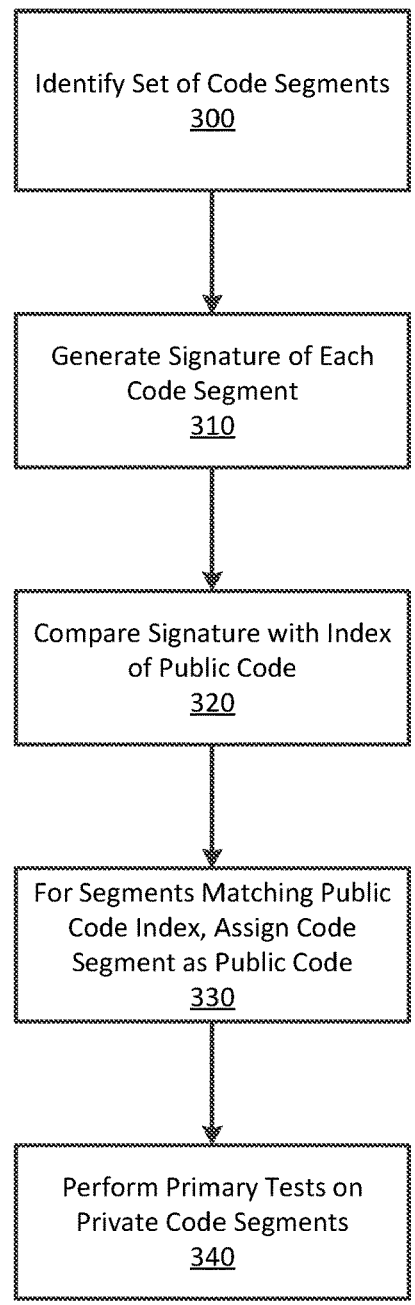
FIG. 3 illustrates an example flowchart for testing an application with distinguished public and private code, according to one embodiment.

FIG. 3 illustrates an example flowchart for testing an application with distinguished public and private code, according to one embodiment. The flowchart shown in FIG. 3 is performed by the code may be performed by the code testing system 100 according to one embodiment.

To analyze an application and adjust testing to account for public code, the flowchart begins by identifying 300 a set of code segments in the application. The code segments, as noted above, may be functions or classes identified in of an application. Next, a signature for each code section is generated 310, such as a hash value for the code. The signature may include additional characteristics of the code segments, such as a namespace or other data determinable from the code segment. For each of the code segments, the code segments are compared 320 against an index of signatures representing public code segments retrieved from a public code repository. Those segments that match the public code signatures are assigned 330 as public code, and a primary set of tests are performed to private code segments that did not match the public code signatures. A different set of tests may also be performed on the public code segments as further described above.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for automated application testing of computer code comprising:

identifying an application for analysis by an automated code testing system;

identifying a plurality of code segments corresponding to the application, wherein each code segment is a separate logical portion of the application;

generating a signature of each code segment in the plurality of code segments, in which the signature includes a hash value generated from applying a hash function to the code segment and a namespace;

comparing the signature of each code segment in the plurality of code segments to a set of signatures associated with publicly-available code to determine whether there is an identical match between the signature of the code segment and any of the signatures of the set of signatures;

assigning each code segment of the plurality of code segments to a primary test group when the comparison determines no identical match or to a secondary test group when the comparison determines an identical match; and performing a first set of code analysis tests by the automated code testing system on the primary test group of code segments and a second set of code analysis tests by the automated code testing system on the secondary test group of code segments, wherein the first set of code analysis tests differs from the second set of code analysis tests.

2. The method of claim 1, wherein the code segments of the plurality of code segments are functions.

3. The method of claim 1, wherein the code segments of the plurality of code segments are classes.

4. The method of claim 1, wherein no testing is performed for the second set of code analysis tests.

5. The method of claim 1 wherein the second set of code analysis tests comprises identifying public code from a public repository corresponding to a set of one or more matching code segments for the match and identifying known defects of the matching segments.

6. The method of claim 1, wherein no testing is performed for the first set of code analysis tests.

7. A non-transitory computer-readable storage medium for automated application testing of computer code containing computer program code for:
   identifying an application for analysis by an automated code testing system;
   identifying a plurality of code segments corresponding to the application, wherein each code segment a separate logical portion of the application;
   generating a signature of each code segment in the plurality of code segments, in which the signature includes a hash value generated from applying a hash function to the code segment and a namespace;
   comparing the signature of each code segment in the plurality of code segments to a set of signatures associated with publicly-available code to determine whether there is a match between the signature of the code segment and any of the signatures of the set of signatures;
   assigning each code segment of the plurality of code segments to a primary test group when the comparison determines no identical match or to a secondary test group when the comparison determines an identical match; and
   performing a first set of code analysis tests by the automated code testing system on the primary test group of code segments and a second set of code analysis tests by the automated code testing system on the secondary test group of code segments, wherein the first set of code analysis tests differs from the second set of code analysis tests.

8. The non-transitory computer-readable medium of claim 7, wherein the code segments of the plurality of code segments are functions.

9. The non-transitory computer-readable medium of claim 7, wherein the code segments of the plurality of code segments are classes.

10. The non-transitory computer-readable medium of claim 7, wherein no testing is performed for the second set of code analysis tests.

11. The non-transitory computer-readable medium of claim 7, wherein the second set of code analysis tests comprises identifying public code from a public repository corresponding to a set of one or more matching code segments for the match and identifying known defects of the matching segments.

12. The non-transitory computer-readable medium of claim 7, wherein no testing is performed for the first set of code analysis tests.

13. A system for automated application testing of computer code, the system comprising:
   a processor configured to execute instructions; and
   a non-transitory computer-readable medium containing instructions executed by the processor, the instructions causing the processor to:
   identify an application for analysis by an automated code testing system;
   identify a plurality of code segments corresponding to the application, wherein each code segment a separate logical portion of the application;
   generating a signature of each code segment in the plurality of code segments, in which the signature includes a hash value generated from applying a hash function to the code segment and a namespace;
   compare the signature of each code segment in the plurality of code segments to a set of signatures associated with publicly-available code to determine whether there is a match between the signature of the code segment and any of the signatures of the set of signatures;
   assign each code segment of the plurality of code segments to a primary test group when the comparison determines no identical match or to a secondary test group when the comparison determines an identical match; and
   perform a first set of code analysis tests by the automated code testing system on the primary test group of code segments and a second set of code analysis tests by the automated code testing system on the secondary test group of code segments, wherein the first set of code analysis tests differs from the second set of code analysis tests.

14. The system of claim 13, wherein the code segments of the plurality of code segments are functions.

15. The system of claim 13, wherein the code segments of the plurality of code segments are classes.

16. The system of claim 13, wherein no testing is performed for the second set of code analysis tests.

17. The system of claim 13, wherein the second set of code analysis tests comprises identifying public code from a public repository corresponding to a set of one or more matching code segments for the match and identifying known defects of the matching segments.

18. The system of claim 13, wherein no testing is performed for the first set of code analysis tests.

* * * * *

UNITED STATES PATENT AND TRADEMARK OFFICE
CERTIFICATE OF CORRECTION

PATENT NO. : 10,289,536 B2
APPLICATION NO. : 15/693341
DATED : May 14, 2019
INVENTOR(S) : Tamir Shavro Page 1 of 1

It is certified that error appears in the above-identified patent and that said Letters Patent is hereby corrected as shown below:

In the Claims
Claim 1, Column 8, Line 65, after "match; and" insert --¶--.
Claim 5, Column 9, Line 11, after "claim 1" and insert --,--.

Signed and Sealed this
Twenty-second Day of October, 2019

Andrei Iancu
*Director of the United States Patent and Trademark Office*